Patented May 13, 1947

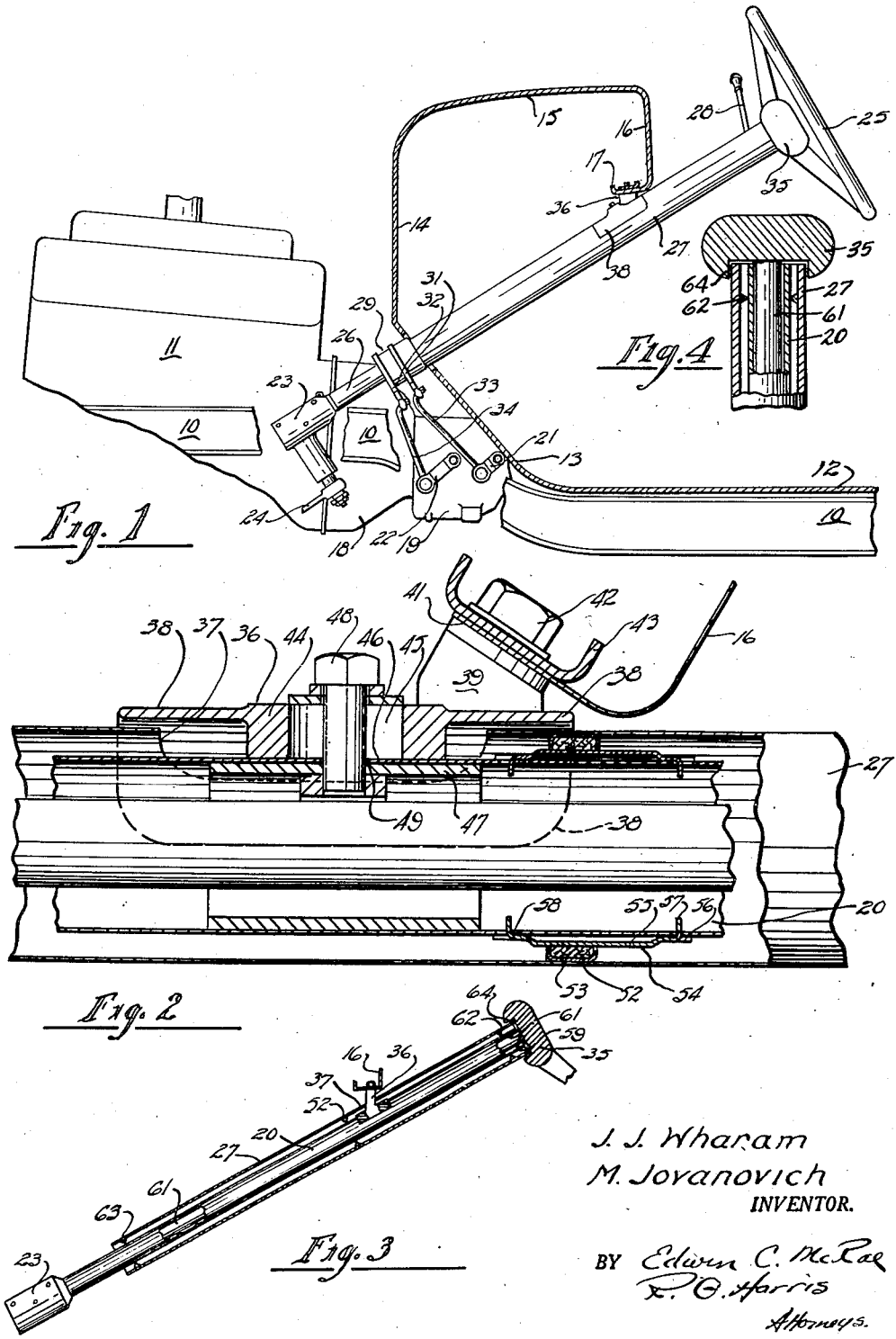

2,420,333

UNITED STATES PATENT OFFICE 2,420,333

CONCENTRIC STEERING COLUMN GEAR-SHIFT SUPPORT CONSTRUCTION

John J. Wharam, Dearborn, and Milton Jovanovich, Detroit, Mich., assignors to Ford Motor Company, Dearborn, Mich., a corporation of Delaware Application October 19, 1945, Serial No. 623,222

6 Claims. (Cl. 74—484)

This invention relates to steering column gearshift control; and, more particularly, to that type of control in which the actuating shaft is arranged concentrically with the steering column of the vehicle and has specific reference to a means for supporting the steering column assembly while permitting the necessary reciprocation and rotation of the actuating shaft.

The advantages of this type of control are set forth at length in the copending applications filed October 19, 1945, entitled Concentric steering column gearshift operating mechanism, Serial No. 623,248, and Concentric steering column gearshift clutch construction, Serial No. 623,247. The present application is limited, primarily, to the arrangement of the concentric tube intermediate the operating mechanism and the clutch which gives a structure of sufficient strength so that in effect it forms an additional support for the instrument panel rather than being merely suspended from it, as has been the case in previous constructions. An advantage of this structure is that the entire steering column assembly is strengthened markedly by the addition of the actuating tube. Another advantage of the construction is that despite the reinforcement afforded by the actuating tube, its ease of reciprocation and rotation is in no wise impaired. Still another advantage is that following the construction shown, the actuating tube appears to be a continuous and completely enclosed element from the hub of the steering wheel through the floor of the vehicle, and all the inner mechanism is at all times kept from view. Still another advantage of the construction is the ease with which the component may be assembled, originally into the steering column assembly; and, subsequently, as a unit, in the vehicle itself.

Other advantages will be apparent from the detailed description of the construction contained in this specification, claimed in the following claims, and shown in the accompanying drawings in which:

Figure 1 is a transverse section through the forward portion of a motor vehicle employing the present type of control showing the relative position of the various components.

Figure 2 is a vertical longitudinal section through the steering column assembly adjacent its connection with the instrument panel of the vehicle.

Figure 3 is a more or less schematic diagram of the components of the steering column illustrating the general arrangement but having a modified arrangement for the intermediate bushing.

Figure 4 is an enlarged view of the upper end of the steering column and casing as shown in Figure 3.

Referring first to Figure 1, 10 indicates the frame (portions of which are broken away) of a motor vehicle supporting the engine 11 and the body of the vehicle, indicated here by the floor 12, the toeboard 13, the dashboard 14, the cowl 15, and the instrument panel 16 having a lower flange 17. The engine terminates in a clutch housing 18 and the transmission 19, the latter being controlled by two operating levers 21 and 22. A steering gear 23 of the usual type is rigidly secured to the frame 10 and has a steering arm 24 controlled by rotation of the steering wheel 25 which is rotatably supported on the fixed steering column 26 secured to the steering gear 23. The actuating tube 27 is mounted concentrically on the steering column 26 and is supported for longitudinal reciprocation and rotation relative thereto in response to the manipulation of the operating lever 28. This movement, in turn, actuates a clutching device indicated generally at 29 having the arms 31 and 32 connected by the links 33 and 34 to the transmission operating levers 21 and 22. The upper end of the tube 27 is concealed within the hub 35 of the steering wheel 25 and since the clutch mechanism 29 is disposed below the toeboard, a steering column assembly appears as a continuous enclosed tube. A bracket 36 is secured to the flange 17 of the instrument panel and to the fixed steering column 26 extending through a longitudinal slot 37 in the tube 27, but this opening is closed by the skirt 38 forming an integral part of the bracket 36.

The detailed construction of the bracket 36 is best shown in Figures 1 and 2, there being two transversely spaced bosses 39 (these bosses are transversely symmetrically aligned so that only the left-hand boss is visible in Figure 1, while in the sectional view of Figure 2 only the right-hand boss is visible), having oblique faces 41 adapted to bear against the lower surface of the flange 17 of the instrument panel and secured in place thereto by the cap screws 42 passing through a reinforcing channel 43 and the flange 17 and threaded into the bosses 39. The main body 44 of the bracket 36 has a longitudinal slot 45 and a curved inner surface 46 conforming to the curvature of the steering column 26. A reinforcing sleeve 47 is secured within the column 26 and is tapped to receive the cap screw 48 passing through the slot 45 and the hole 49 in the steering column 26. When the screw 48 is drawn up, the steering column is rigidly secured to the instrument panel 16. The skirt 38, semicylindrical in section, is formed on body 44 and extends longitudinally of the column sufficiently to cover the slot 37 in extreme positions of reciprocation and circumferentially sufficiently to maintain this closure during rotation of tube 27. Thus, the apparent continuity of the tube 27 is preserved.

A fabric bearing 52 partially encased by the metal backing ring 53 is introduced into the interior of the tube 26 through the slot 37 and pressed into place in it a short distance above or below this opening. In Figure 2, the bearing is shown above the slot and in Figure 3 below it, but it serves equally well in either position. The co-operating bearing surface on the fixed steering column 26 is provided by the ring 54 having a cylindrical central section 55 spaced radially outwardly of the surface of the column and held in place on the column by end section 56 which fits the outer surface of the column quite snugly and the tabs 57 which are stuck inwardly and extend through holes 58 in the column itself. The advantage of the specific construction shown, using the ring 54 is that the tube 27 will slide over the steering column 26 quite easily during assembly, since there is considerable clearance between the inner surface of the bearing 52 and the outer surface of the column until actual engagement occurs with the ring 54 when the tube 27 is approximately in its proper longitudinal position. In addition, a special bearing surface can be provided on the outer surface of the ring 54 using any treatment desired, while the entire outer surface of the steering column may be given protective uniform treatment best designed for resistance to deterioration.

The general relationship of the assembly is shown in Figure 3 in which it will be noted that the steering column 26 rotatably supports through a bushing 59 the steering shaft 61 which is fixed for rotation with the hub 35 and in the steering gear 23. In addition to the intermediate bushing 52, just described in detail, there is an upper bushing 62 and a lower bushing 63 interposed between the tube 27 and the column 26—all three of which permit relative rotation and longitudinal reciprocation of the tube. The hub 35 has a circumferential slot 64 on its lower surface which receives the upper ends of the column 26 and the tube 27 and encloses the latter even when the tube is in its lowermost position of reciprocation.

The advantage of this general construction is also believed to be clear. Because of its much larger diameter, the tube 27 has a far greater resistance to bending than has the column 26 or the shaft 61 even though the latter has a much greater cross sectional area of metal. In driving, many drivers are prone to lean on the steering wheel and the force so applied is often sufficient either to bend the column or deflect the instrument panel in the conventional type of construction. Here, because of the bearings 52 and 63, any force so applied is borne primarily by the tube 27 which possesses the maximum resistance even though the tube is both reciprocable and rotatable with respect to the remainder of the column. Further, since the intermediate bushing is adjacent the instrument panel bracket 36, the assembly is reinforced where it needs it most—adjacent that component. As a result, the entire assembly is much stronger and deflection of the column is avoided even under the most rigorous service without deterring the movement of the actuating tube.

It is realized that certain changes may be made in the specific construction shown and described herein, but it is the intention to cover by the claims such of these changes as are reasonably within the scope thereof:

The invention claimed is:

1. In a steering column gearshift control construction, comprising, a steering column rigidly secured at its lower end, a steering shaft rotatably supported within said column, an actuating tube arranged concentrically exteriorly of said column for longitudinal reciprocation and rotation, a fixed intermediate support for said column, a bushing interposed between said column and said tube adjacent the upper end thereof, a second bushing interposed between said column and said tube adjacent the lower end thereof, and a third bushing interposed between said column and said tube intermediate the ends of said tube.

2. In a steering column gearshift control construction, comprising, a steering column rigidly secured at its lower end, a steering shaft rotatably supported within said column, an actuating tube arranged concentrically exteriorly of said column for longitudinal reciprocation and rotation, a fixed intermediate support for said column, a bushing interposed between said column and said tube adjacent the upper ends thereof, a second bushing interposed between said column and said tube adjacent the lower end of said tube, and a third bushing interposed between said column and said tube adjacent said fixed intermediate support.

3. In a steering column gearshift control construction, comprising, a steering column rigidly secured at its lower end, a steering gear, a steering shaft rotatably supported in said steering gear and extending through column and terminating in a steering wheel affixed to the upper end thereof, a bushing between said column and said shaft at said upper end, an actuating tube arranged concentrically exteriorly of said column for reciprocation and rotation relative thereto, a fixed external intermediate support for said column, and bushings interposed between said column and said tube adjacent the upper end of said tube and the lower end of said tube and said fixed support.

4. The structure of claim 3 which is further characterized in that said last-named bushing comprises a metal backed fabric bearing pressed within said tube and reciprocably and rotatably engaging a metal ring secured on the outer surface of said column and having its co-operating bearing surface spaced radially outwardly of said column.

5. The structure of claim 3 which is further characterized in that said last-named bushing comprises a fabric bearing having a metal ring pressed within said tube, a co-operating bearing surface associated with said column to permit longitudinal reciprocation and rotation of said tube comprising a metal ring having a bearing surface spaced substantially outwardly of the surface of said column and extending longitudinally of said column sufficiently to maintain bearing engagement during reciprocation of said tube.

6. The structure of claim 3 which is further characterized in that said fixed external intermediate support comprises a bracket extending through a longitudinal slot in said tube and is attached at one end to the instrument panel of the vehicle and at its other end to said column and including a skirt adapted to cover said longitudinal slot at extreme positions of reciprocation and rotation of said tube.

JOHN J. WHARAM.
MILTON JOVANOVICH.

REFERENCES CITED

The following references are of record in the file of this patent:

UNITED STATES PATENTS

| Number | Name | Date |
|---|---|---|
| 2,317,654 | Wharam | Apr. 27, 1943 |
| 1,815,871 | Douglas | July 21, 1931 |
| 1,515,236 | Woodward | Nov. 11, 1924 |
| 1,425,227 | Woodward | Aug. 8, 1922 |